US011657101B2

(12) United States Patent
Walia et al.

(10) Patent No.: US 11,657,101 B2
(45) Date of Patent: May 23, 2023

(54) DOCUMENT INFORMATION EXTRACTION SYSTEM USING SEQUENCED COMPARATORS

(71) Applicant: Goldman Sachs & Co. LLC, New York, NY (US)

(72) Inventors: Prabhdeep Singh Walia, Bengaluru (IN); Vikas Kushwaha, Delhi (IN)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 16/740,754

(22) Filed: Jan. 13, 2020

(65) Prior Publication Data

US 2021/0216595 A1    Jul. 15, 2021

(51) Int. Cl.
| | |
|---|---|
| *G06F 16/93* | (2019.01) |
| *G06F 16/22* | (2019.01) |
| *G06F 16/28* | (2019.01) |
| *G06F 16/904* | (2019.01) |
| *G06F 40/103* | (2020.01) |

(52) U.S. Cl.
CPC .......... *G06F 16/93* (2019.01); *G06F 16/2246* (2019.01); *G06F 16/288* (2019.01); *G06F 16/904* (2019.01); *G06F 40/103* (2020.01)

(58) Field of Classification Search
None
See application file for complete search history.

(56) References Cited

U.S. PATENT DOCUMENTS

| | | | | |
|---|---|---|---|---|
| 2002/0184252 A1* | 12/2002 | Holtz | ...................... | G06F 16/13 |
| 2003/0110150 A1* | 6/2003 | O'Neil | ..................... | G06F 16/86 |
| 2009/0157572 A1* | 6/2009 | Chidlovskii | ........... | G06N 20/00 |
| | | | | 706/12 |

(Continued)

FOREIGN PATENT DOCUMENTS

KR    10-2011-0112397 A    10/2011

OTHER PUBLICATIONS

Asghari et al., "XML document clustering: techniques and challenges", 2013 (Year: 2013).*

(Continued)

*Primary Examiner* — Dawaune A Conyers
(74) *Attorney, Agent, or Firm* — Fenwick & West LLP

(57) ABSTRACT

A document information extraction system determines a structure of an electronic document based on characteristics of the document's constituent elements. The system segments the document to generate elements with each element having similar characteristics. Elements may be clustered to assist in determining the document structure. The system determines directional relationships between elements (e.g., above, below, etc.). The system then employs a master comparator to determine familial relationships between adjacent elements. The master comparator includes a set of unit comparators and each unit comparator compares a specific characteristic between two elements. The master comparator sequentially applies the unit comparators to determine the familial relationship based on the comparisons. The system outputs a document hierarchy tree reflecting the determined familial relationships. The hierarchy tree represents the structure of the document.

27 Claims, 4 Drawing Sheets

(56) References Cited

U.S. PATENT DOCUMENTS

| | | | |
|---|---|---|---|
| 2010/0138415 A1* | 6/2010 | Lein | G06F 16/9027 |
| | | | 707/736 |
| 2012/0072824 A1 | 3/2012 | Sherkin et al. | |
| 2012/0278321 A1 | 11/2012 | Traub et al. | |
| 2014/0149132 A1 | 5/2014 | DeHaan et al. | |
| 2015/0154164 A1* | 6/2015 | Goldstein | G06F 40/106 |
| | | | 715/229 |
| 2017/0017613 A1* | 1/2017 | Simonyi | G06F 40/106 |
| 2019/0073528 A1* | 3/2019 | Agarwalla | G06V 30/413 |

OTHER PUBLICATIONS

Oracle, Oracle Healthcare Master Person Index, 2016 (Year: 2016).*

PCT International Search Report and Written Opinion, PCT Application No. PCT/IB2021/050179, dated Apr. 8, 2021, nine pages.

Denny, J. C. et al., "Evaluation of a Method to Identify and Categorize Section Headers in Clinical Documents," Journal of the American Medical Informatics Association, Nov. /Dec. 2009, pp. 806-815, vol. 16, No. 6.

El-Haj, M. et al., "Detecting Document Structure in a Very Large Corpus of UK Financial Reports," European Language Resources Association (ELRA), Proceedings of the Ninth International Conference on Language Resources and Evaluation (LREC '14), May 2014, pp. 1335-1338.

Mohemad, R. et al., "Automatic Document Structure Analysis of Structured PDF Files," International Journal of New Computer Architectures and their Applications (IJNCAA), Aug. 2011, pp. 404-411.

Nguyen, C. D. et al., "EREL: an Entity Recognition and Linking algorithm," Journal of Information and Telecommunication, 2018, pp. 33-52, vol. 2, No. 1.

Wnek, J., "Machine Learning of Generalized Document Templates for Data Extraction," Springer, DAS 2002: Document Analysis Systems V, Lecture Notes in Computer Science, Aug. 2002, pp. 457-468, vol. 2423.

* cited by examiner

DOCUMENT INFORMATION EXTRACTION SYSTEM USING SEQUENCED COMPARATORS

FIELD OF DISCLOSURE

This disclosure relates generally to determining a document structure, and, in particular, to extracting information from a document based on the determined structure.

BACKGROUND

Information extraction in a document is the retrieval of specific information, or types of information, related to a selected topic from a document. Information extraction locates specific items, words, lines, etc. ("information") within a document. Extracted information may have an underlying structure that allows that information to be categorized and cataloged efficiently.

Automated information extraction is a technically complex process and, unfortunately, accurate extraction of information from documents is error prone using current solutions. Many of these problems stem from the fact that while many documents share a common structure, how that structure is implemented and reflected in the documents' information is not consistent. For example, different documents format sections, headers, sub-headers, etc., in different manners. Accordingly, a method that allows a system to accurately determine the structure of a document regardless of its implementation would be beneficial.

SUMMARY

A document information extraction system determines the structure of an electronic document based on characteristics of the document's constituent elements. The structure of a document is a high-level representation of the information in a document. As an example, the structure may be a hierarchical tree structure of information within the document.

Elements within a document are its constituent parts and represent some portion of the information included in the document. As an example, an element may be a word, or set of words, in the document. Characteristics of the elements may include visual and/or location characteristics. To illustrate, a visual characteristic may be font size, while a location characteristic may a coordinate.

The system determines elements in a document via segmentation. Segmenting the document identifies and clusters information in the document having similar characteristics. For example, the system may segment a document into a multitude of words. Or, more robustly, the system may segment the document into a multitude of characters and group characters into different words, and, furthermore, may group words into lines of text. The system may group the characters because they have similar y-coordinates and font size. Similar examples of segmenting and clustering are also possible.

The system may determine directional relationships between elements to assist in determining the structure. A directional relationship defines a type of adjacency between elements having overlapping location characteristics. For example, the system may determine a first element that is adjacent to a second element has a directional relationship of "to the right."

Further, the system may cluster elements based on their location to assist in determining the structure. A cluster includes several elements with at least one similar location and/or visual characteristic. For example, a cluster may group all of elements in a specific area of the document (e.g., a paragraph, a list, etc.). As another example, a cluster may group all elements having a similar font style (e.g., bolded).

The system determines the document's structure by determining familial relationships between elements. Familial relationships include parent, child, sibling, and unrelated. The relationships represent hierarchical connectivity in the document's structure. Further, the relationships enable visualization of the structure as a document tree.

The system determines familial relationships by comparing characteristics between elements, or clusters, in the document. To do so, the system employs a master comparator including a set of unit comparators. Each unit comparator compares a specific characteristic between two elements and determines a familial relationship. However, a single unit comparator may incorrectly determine a familial relationship. As such, the master comparator sequentially applies the unit comparators, and based on sequential results of the unit comparators, outputs an accurate familial relationship between the elements. The sequence and selection of unit comparators is made by the designer of the system to accurately determine document structure.

The master comparator can include unit comparators to identify structure based on indexing, formatting, and/or other characteristics. Further, the master comparator can identify familial relationships in both a horizontal and vertical direction. Finally, the system can validate familial relationships by analyzing an element's grandparents and grandchildren within the document.

The system generates a document tree representing the structure of the document using the determined familial relationships. The system may also populate the visualization using named entity tagging, leveraging the document tree to find relationships between said entities. Finally, the visualization may be generated in response to a user requesting the structure of the document.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Document Information Extraction Environment

Figure 1:
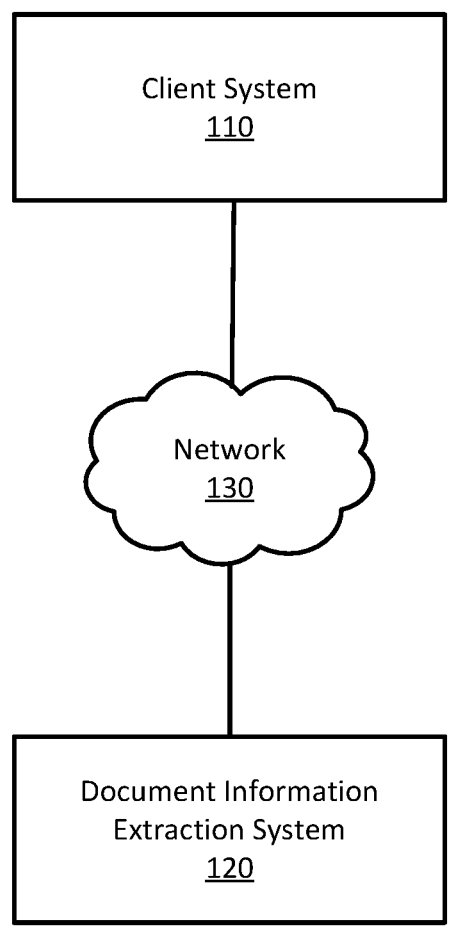
FIG. 1 illustrates an environment for a document information extraction system, according to one example embodiment.

FIG. 1 illustrates a system environment for a document information extraction engine, according to one example. The environment 100 includes a client device 110 and a document information extraction ("DIE") system 120 communicating over a network 130.

A client device 110 is a computing device capable of generating, accessing, or receiving an electronic document. For example, in an embodiment, the client device 110 is a laptop computer configured to generate a document using word processing software. In other examples, a client device 110 may be a device having computer functionality, such as a personal digital assistant (PDA), a mobile telephone, a smartphone or another suitable device. The client device 110 is configured to communicate with the DIE system 120 via the network 130. For example, in an embodiment, the client device 110 may be a cellular phone configured to communicate with the DIE system 120 via a mobile network 130.

The DIE system 120 receives a document from a client device 110 and determines a structure of the document in response. A document structure is a high-level representation of the information, such as the hierarchical structure of the information, in a document. The structure may be represented as a visualization such as a document tree. To determine the structure, as described in greater detail below, the DIE system 120 segments the document into elements, determines familial relationships between elements, and determines the structure of the document based on the determined familial relationships. The DIE system 120 may provide the structure to the client device 110 via the network 130.

The network 130 comprises any combination of local area and/or wide area network 130s, using both wired and/or wireless communication systems. The network 130 may employ various communications technologies and/or protocols. For example, the network 130 may utilize communication technologies such as Ethernet, 802.11, 3G, 4G, digital subscriber line (DSL), etc. The network 130 may also employ network 130 protocols for communicating information via the network 130. Some example protocols may include transmission control protocol/Internet protocol (TCP/IP), hypertext transport protocol (HTTP), simple mail transfer protocol (SMTP), file transfer protocol (FTP), etc. Data exchanged over the network 130 may be represented using any suitable format, such as hypertext markup language (HTML) or extensible markup language (XML). In some embodiments, all or some of the communication links of the network 130 may be encrypted using any suitable technique or techniques.

The environment 100 may take other configurations. To illustrate, in an example embodiment, the DIE system 120 may be implemented on a client device 110 rather than on a remote system connected to the client device 110 via the network 130. For example, the DIE system 120 may be implemented as a plugin for a word processing system executing on the client device 110. In this case, the DIE system 120 may receive a document from the word processing system, determine the structure, and provide the structure to the word processing system in response. In another example, the DIE system 120 may be a standalone program on a client device 110. In this case, the DIE system 120 may access a document stored on the client device 110, determine the structure, and provide a representation of the structure to the program in response. In another example embodiment, the DIE system 120 may be implemented as a network 130 system accessible through an application executing on the client device 110. In this case, multiple client devices (not illustrated) may connect to the DIE system 120, provide a document, and receive a structure in response.

Document Information Extraction System

Figure 2:
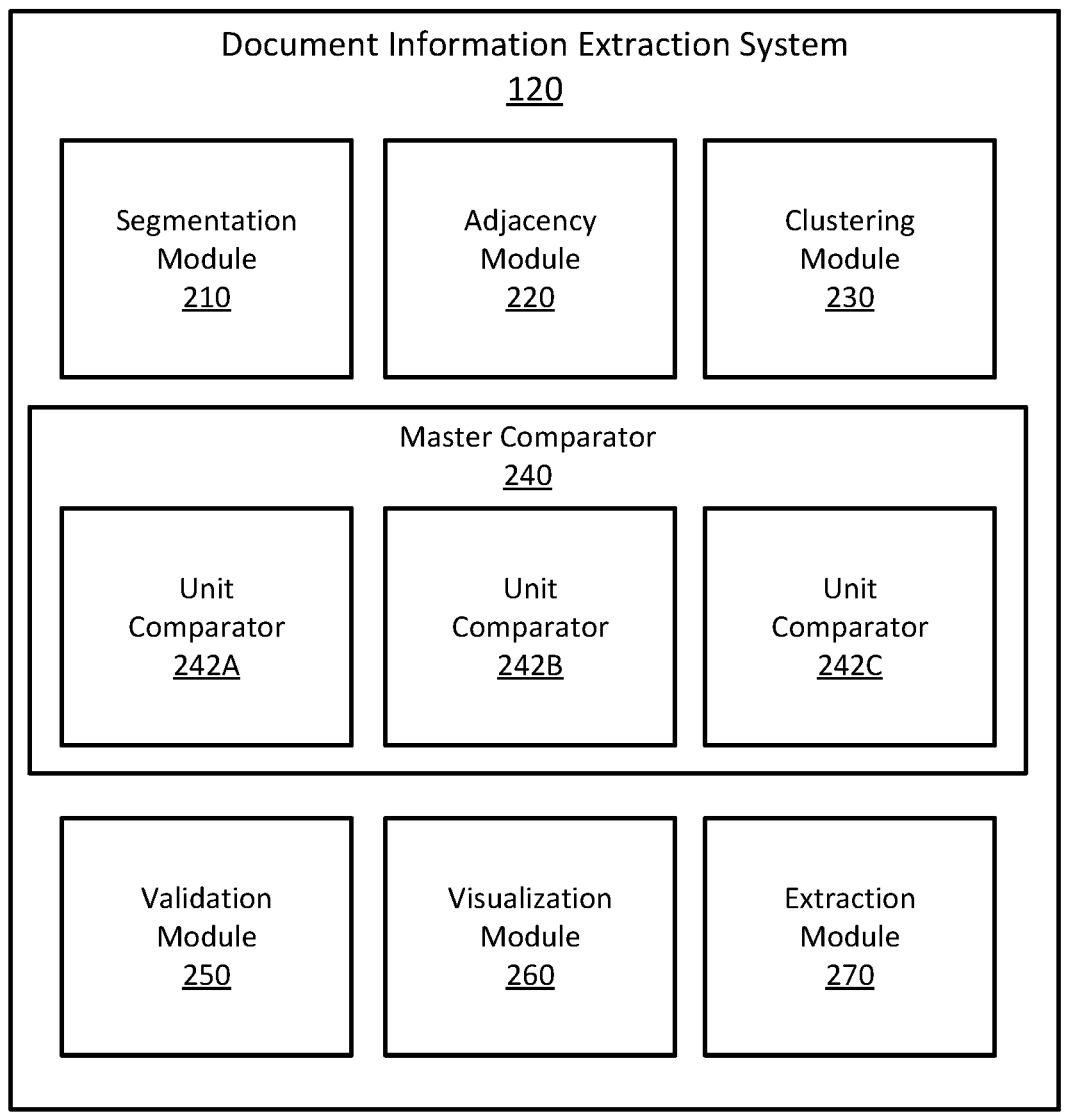
FIG. 2 illustrates a block diagram representing a document information extraction system, according to one example embodiment.

FIG. 2 is a block diagram illustrating a document information extraction system, according to one embodiment. As shown in FIG. 2, the DIE system 120 includes a segmentation module 210, an adjacency module 220, a clustering module 230, a master comparator 240, a validation module 250, a visualization module 260, and an extraction module 270. As illustrated, the master comparator 240 includes three unit comparators (e.g., unit comparator 242A, 242B, and 242B, referred to in general as unit comparator 242), but could include different numbers of unit comparators 242. Other embodiments of the DIE system 120 may include fewer, additional, or different modules, and the functionality may be distributed differently between the modules.

Broadly, the DIE system 120 receives a document and determines its structure. To do so, the DIE system 120 determines the elements in the document, determines directional relationships between the elements, and generates clusters of elements. Subsequently, the DIE system determines hierarchical relationships between the elements (or clusters), determines the structure based on the hierarchical relationships, and generates a visualization of the structure using the relationships.

Segmenting a Document

The DIE system 120 includes a segmentation module 210 that segments a document into its constituent elements. An element is the smallest constituent part of a document and represents some portion of the information included in the document. Elements may be represented by, at a high level, the structure. To illustrate, consider a document that is a page of words. The elements in the document are the constituent words in the document and the structure is the hierarchical order of the information represented by the words in the document.

More broadly, elements may represent different types of information that may be found in a document. For example, elements may represent characters, numbers, words, images, lines of text, or some other element in a document that may convey information. Furthermore, as described in greater detail below, the relationship between elements in the document form the basis for determining the structure of the document.

Each element in the document has one or more visual characteristics, and may have one or more visual characteristics in common with other elements in the document. To illustrate, the element "F" may have visual characteristics including, for example, font type, font size, underlined, and capitalized. This is just an example and are many other types of visual characteristics are possible. For example, visual characteristics may include font size, font family, boldness, underlining, capitalization, italicization, font color, background color, cluster, and bounding box. Other examples are also possible.

Each element in the document has one or more location characteristics. A location characteristic is a description of a location of an element within the document. As an example, the element "F" may having an (x, y) coordinate in the document and the location characteristic for the element is that coordinate. Other examples are also possible. In various embodiments, location characteristics may have different frames of reference. For example, the location characteristic for an element may be the center of the element, the upper-left of a box surrounding the element, etc. Further, the location characteristics may include additional attributes that may be associated with the location. For example, a location characteristic may be a coordinate and a size, where the size is the size of the element at the coordinate (e.g., a pixel size of an element bounding box). Whatever the implementation, a location characteristic for an element provides a method for spatially locating an element in a document.

Additionally, in some embodiments, the location characteristic of an element may also include visual coordinates for the element. A visual coordinate represents a visual boundary for the element rather than its absolute location within the document. For example, an element may be surrounded by a large amount of white space within a document. In this case, the visual coordinate for the element may include some portion of the white space surrounding the element. In this manner, a visual coordinate for an element within a document may provide a more accurate representation of the location of an element within a document when determining the structure.

The DIE system 120 includes an adjacency module 220 that determines directional relationships between elements in the document. A directional relationship defines a type of adjacency between elements having overlapping location characteristics. As an example, for the character elements "TX" in a document, the "T" element has a directional relationship with the "X" element (and visa-versa). In particular, the "X" element has a "right" directional relationship with "T," and the "T" element has a "left" directional relationship with "X." Naturally, many more directional relationships may exist. For example, the directional relationships may include top, bottom, left, right, etc.

The adjacency module 220 determines directional relationships between two elements by comparing their location characteristics. If the location characteristics are adjacent and/or overlapping, the adjacency module 220 determines the appropriate directional relationship. Referring to the previous example, the "T" element has a location characteristic of (1232, 855, 14, 8), where, in pixels, 1232 is the x-coordinate, 855 is the y-coordinate, 14 is the height, and 8 is the width. The "X" element has a location characteristic of (1240, 855, 14, 10) in the same coordinate system. Here, the adjacency module 220 determines the "X" element is to the right of the "T" element because the x-coordinate of the "X" element overlaps the "T" element and has a higher x coordinate than the "T" element. The adjacency module 220 similarly determines the "T" element is to the left of the "X" element.

Note that elements and their determined directional relationships may include elements other than characters. For example, a document may include the two text elements "GO" and "EARTHQUAKES." In this case, the elements have location coordinates representing the entire word, and the adjacency module 220 determines that the word "EARTHQUAKES" is to the right of "GO," and the word "GO" is to the left of "EARTHQUAKES." The adjacency module 220 may also determine directional relationships between elements of different types. For example, a document may include the text element "LUVU" and an image element that is a heart emoji. In this case, each of the elements have location coordinates describing their location in the document and the adjacency module 220 can determine directional relationships between the two.

The DIE system includes a clustering module 230 that groups elements into clusters based on their location characteristics. As an example, a document includes a column of text elements including "BACON," "LETTUCE," "TOMATO, "BREAD," and "MAYONAISE," respectively. In the column, the first four words are on four subsequent lines, while the word "MAYONAISE" is five lines after the word "BREAD." The clustering module 230 groups the elements based on their position in the document. To illustrate, the clustering module 230 creates a cluster including "BACON." The clustering module 230 checks the document for nearby elements that may be added to the cluster. Here, the clustering module 230 adds "LETTUCE" to the cluster including "BACON" because the location characteristics for "LETTUCE" indicate the "LETTUCE" element is less than a threshold maximum distance from the "BACON" element. The clustering module 230 continues to check for elements to add to the cluster until there are no elements within the threshold distance. In this case, the clustering module 230 clusters the words "BACON," "LETTUCE," "TOMATO," and "BREAD" because they are within the threshold distance from one another. The clustering module 230 does not include the element "MAYONAISE" because it is located too far from the clustered elements.

The clustering module 230 may generate clusters in a variety of manners. For example, as described above, the clustering module 230 may generate clusters based on the vertical distances between elements. However, in other embodiments, the clustering module 230 may generate clusters based on the horizontal distances, absolute proximity, relative proximity, etc. between elements. More generally, the clustering module 230 generates clusters based on the underlying structure of a document reflected in the location characteristics of its constituent elements.

Comparators

The DIE system 120 includes a master comparator 240 that determines familial relationship between elements in the document by comparing their characteristics (e.g., location, visual). Familial relationships between elements may be used to define the hierarchical structure of the document. The master comparator 240 compares documents where the segmentation module 210 has segmented the document into elements, the adjacency module 220 has determined directional relationships between elements in the document, and the clustering module 230 has clustered elements in the document.

The master comparator 240 compares two elements (e.g., a first element and a second element) to determine a familial relationship based on one or more of their characteristics. The master comparator 240 may determine one of four relationships between elements: parent, child, sibling, and unrelated. Clarifying the relationships: (i) a first element is parent to a second element if the first element is directly above the second element in the document hierarchy, (ii) a first element is a child to a second element if the first element is directly below the second element in the document hierarchy, (iii) a first element is a sibling to a second element if the first element and the second element are at the same level in the document hierarchy, and (iv) a first element is unrelated to a second element if they are not connected in the document hierarchy. When comparing the first element and the second element, the output of the master comparator 240 may be 1, 0, or −1, indicating the first element may be the parent, sibling, or unrelated, to the second element, respectively. In various embodiments, familial relationships may include more extended relationships between elements such as, for example, grandchild, great-grandparent, etc.

A master comparator 240 includes comparators 242 which enable the master comparator 242 to determine familial relationships between elements. A unit comparator 242 determines a familial relationship between a first element and a second element (e.g., determining 1, 0, −1) by analyzing a single characteristic of the elements. That is, a unit comparator 242 compares one characteristic, while the master comparator 240 compares several characteristics using its constituent unit comparators (e.g., unit comparators 242A, 242B, and 242C of master comparator 240).

Characteristics analyzed by a unit comparator 242 may be visual and/or location characteristics. For example, a first unit comparator 242A may compare font size between a first element and a second element to determine a familial relationship; a second unit comparator 242B may compare a y coordinate between the first element and the second element to determine a familial relationship; and, a third unit comparator 242C may compare a boldness between a first element and a second element. Other examples are possible.

Unit comparators 242 are linked together in series to form the master comparator 240. That is, unit comparators 242 within a master comparator 240 sequentially compares characteristics of two elements to determine the familial relationship. To illustrate, consider, for example, a master comparator 240 including five unit comparators 242. The master comparator 240 compares a first characteristic of two elements using the first unit comparator 242, compares a second characteristic of the elements using the second unit comparator 242, compares a third characteristic of the elements using the third unit comparator 242, etc.

In this architecture, the master comparator 240 stops comparing elements with unit comparators 242 when the result of a unit comparator 242 is non-zero (e.g., a parent or unrelated relationship is found). If a unit comparator 242 returns a non-zero result, the master comparator 240 assigns a relationship between the two elements determined by the last invoked unit comparator 242. To illustrate, continuing the previous example, the master comparator 240 determines a familial relationship between two elements by sequentially employing the five unit comparators 242 until a non-zero result is found. In a first example, the unit comparators 242 return "0, 0, 0, 0, 0" indicating that two elements are siblings. In a second example, the unit comparators 242 return "0, 0, 0, −1" indicating that two elements are unrelated. In a third example, the unit comparators 242 return "0, 1" indicating that a first element is a parent to a second element. Other examples are also possible.

Due to this architecture, the unit comparators 242 selected and their sequential order in the master comparator 240 enable accurate determination of the structure of a document. For example, the master comparator 240 should employ unit comparators 242 comparing the visual and/or location characteristics that are most indicative of familial relationships. Additionally, the order of comparisons between elements in a document is also helpful in determining a structure of the document. For example, elements may be compared in a standard left-to-right then top-to-bottom reading order, bottom-to-top by y-coordinates, or some other order. The implementer of the DIE system 120 can configure the sequence of unit comparators 242 in a master comparator 240 as desired. In various embodiments, the DIE system 120 employs a wide variety of comparators, comparator sequences, and comparison orders depending on the type of document, element types in the document, application space, etc. Several specific methodologies for determining document structure using a master comparator 240 are described herein, but are not intended to be limiting. More generally, the DIE system 120 employs a sequence of unit comparators 242 in a master comparator 240 to determine the structure of a document.

Example: Formatting Based Master Comparator

In an embodiment, the DIE system 120 may employ a master comparator 240 configured to determine familial relationships based on the formatting of elements in the document ("formatting configuration"). In the formatting configuration, the master comparator 240 is configured to determine parent relationships in a bottom-up, line-by-line fashion. More particularly, in one embodiment a first element is a second element's parent if (i) the horizontal overlap of the visual coordinates between the two elements overlap and (ii) the first element has an above directional relationship to the second element. In this configuration, if a first element in a first line is defined as a child to a second element in a second line, all elements in the first line are assigned as child to the second element in the second line. Further, in some configurations, the master comparator 240 may define all siblings to the first element as a child to the second. In this manner, the structure of a document is largely defined in a line-by-line basis.

In the formatting configuration, the master comparator 240 may also employ other comparators to determine a parent relationship based on other characteristics. For example, the master comparator 240 may employ unit comparators 242 that are more likely to indicate structure based on format (e.g., font size, cluster, and boldness). In some configurations, the master comparator 240 may also employ a number of other comparators less likely to indicate structure based on format (e.g., indentation, italics, capitalization color, element boundaries). Other comparators are also possible.

Example: Indexing Based Master Comparator

In an embodiment, the DIE system 120 may employ a master comparator 240 configured to determine familial relationships based on indexing elements (e.g., bullets, numbered lists, etc.) in the document ("indexing configuration"). In the indexing configuration, the master comparator 240 is configured to determine parent relationships in a left-to-right, top-to-bottom fashion. Here, the indexing element before other elements in a line may automatically assign a parent to other elements in the line with the indexing element.

To illustrate, consider a document with a first line reading "SCHEDULE" and a bulleted list including "• WAKE UP," "• BRUSH TEETH," "• SHOWER," "• GET DRESSED," and "• GO TO WORK," on the subsequent lines. The DIE system 120 employs the master comparator 240 to determine that the element "SCHEDULE" in the first line is the parent to the element "• WAKE UP" in the second line. The DIE system 120 stores the indexing element "•" in the second line in an indexing cache and associates the element with (i) its parent, and (ii) its corresponding location characteristics (e.g., indentation). Moving forward, the master comparator 240 automatically assigns elements including the indexing element "•" having the appropriate location characteristics (e.g., indentation) as the child of the parent associated with that indexing element. In this manner, the elements "• BRUSH TEETH," "• SHOWER," "• GET DRESSED," and "• GO TO WORK" are assigned as children of the element "SCHEDULE."

In a similar example, consider a document with a first line reading "FAMILY SCHEDULE" and a numbered list including "1. DAN SCHEDULE," and "2. CHRIS SCHEDULE." Each of the numbered lists includes a bulleted list similar to the one described above. In this example, the parent is "FAMILY SCHEDULE," whose children are "DAD SCHEDULE," and "CHRIS SCHEDULE." Each of the children "DAD SCHEDULE" and "CHRIS SCHEDULE" have children which are the elements in their corresponding bulleted list.

The DIE system 120 may track several indexing elements within a single document using the indexing cache and the indexing elements location characteristics. Additionally, the DIE system 120 may delete any previous entry of an indexed element whenever a new indexed element is found, because only recent indexing entries may be needed to assign familial relationships for subsequent indices.

Example: Master Comparators for Horizontal Parents

The previous two examples illustrate configurations in which the DIE system 120 identifies parents and children from vertical associations (e.g., the parent is above the child). However, in some documents, a parent may be in the same line as a child. In this case, the DIE system 120 may employ a master comparator 240 configured to determine horizontal familial relationships ("horizontal configuration").

In the horizontal configuration, the DIE system 120 employs the master comparator 240 to determine familial relationships in a vertical manner using previously described configurations (e.g., indexing, formatting). However, here, the DIE system 120 employs a master comparator 240 that also compares elements in the same horizontal position in the document. The master comparator 240 may compare in a horizontal manner in a similar manner to the vertical manner. That is, a first element is defined as a second element's parent if the first element has a left directional relationship to the second element, and the second element satisfies any of the other comparisons necessary to satisfy the parent child relations (e.g., boldness, indentations, etc.). In some examples of the horizontal configuration, the master comparator 240 can also employ elements similar to the indexing configurations. For example, if an element includes a key-value separator (e.g., a colon), the master comparator 240 may define that an element after the key-value separator is the child of the element including the key value separator. Other similar examples are also possible.

In the horizontal configuration, the DIE system 120 may also employ the master comparator 240 to determine if a previously assigned parent in a vertical direction is also the parent of an element identified horizontally. To do so, the master comparator 240 may use the elements location characteristics to determine parents located in the vertical direction.

Example: Master Comparator for Multi-Line Parents

The previous examples illustrate configurations in which the DIE system 120 identifies parents and children from vertical and/or horizontal associations. However, in some documents, a parent may be spread across multiple lines and the DIE system 120 can still identify these multi-line parents ("co-parents").

To identify a co-parent, the DIE system 120 employs the master comparator 240 to compare adjacent elements. Here, the DIE system 120 employs the master comparator 240 to compare a parent element to adjacent elements having either an above or below directional relationship with the parent element to determine if they are an adjacent parent. The master comparator 240 identifies adjacent parents as co-parents when (i) the potential co-parent does not have any children, (ii) the co-parents have the same parent, (iii) the co-parents are identified as siblings by hierarchy comparators.

Parent Validation

The DIE system 120 includes a validation module 250 that validates familial relationships determined by the master comparator 240. To validate a familial relationship, the validation module 250 compares a first element and a second element having a grandchild and grandparent relationship by employing the master comparator 240 as described herein. That is, the validation module 250 employs the master comparator 240 to compare a grandchild element to a grandparent element.

Comparing grandchildren to grandparents allows the DIE system 120 to find parental relation which require greater context. To illustrate, consider, for example, a document including a chapter including several sections, and each section includes a corresponding sub-section. The text in each section is normal, while the text in each sub-section is italicized. Depending on the configuration, the DIE system 120 may identify the alternating formats as parent, child, grandchild, great-grandchild, etc. as it moves down (or up) the document. To validate the relationships, the validation module 250 compares a grandchild element to a grandparent element using the master comparator 240. If the master comparator 240 determines the two elements are siblings (e.g., the master comparator 240 returns "0") the familial relationships are updated accordingly. For example, using the previous example, the validation module 250 would ensure that each of the sections would be the parent of their sub-sections, each of sections are siblings, the chapter is the parent to the sections, and the chapter is grandparent to the sub-sections.

Applications

The DIE system 120 includes a visualization module 260 that generates a visualization of the structure of the document. Again, the structure of the document is the hierarchy of information in the document and may represented by familial relationships determined by the master comparator 240. Therefore, the visualization creates an easily understandable structural representation of information within the document.

As an example, the visualization module 260 generates a document tree to represent the structure of a document received from a user. The document tree is similar in structure to a family tree, with the various connections between parents, children, grandchildren, grandparents, etc. represented as a hierarchical tree. The DIE system 120 creates a visualization representing the structure as a document tree and provides the document tree to the user. The document tree allows the user to view the structure of the document.

The document tree may also be represented as a data structure or metadata associated with the document rather than a visualization. Other visualizations are also possible. For example, the visualization module 260 may generate a collapsible list, an outline, or some other visualization to represent the structure of the document. The visualization may be provided to the person transmitting the document to the DIE system 120, or some other person.

The DIE system 120 may generate a visualization in response to a request received from a client system 110. The request may include a request to generate the visualization according to any suitable criteria (characteristic types, clusters, comparator configurations, etc.). Once generated, the visualization may be transmitted to the requesting client system 110.

The DIE system 120 includes an extraction module 270 that extracts information from the document based on its structure. For example, a user of the DIE system 120 may request all information included in the document at a particular hierarchy level (e.g., section headings) and the extraction module 270 may provide the information in response. In another example, the DIE system 120 may request the visual characteristics of a particular element in the document and the extraction module 270 may access and provide those characteristics in response. The extraction module 270 may use the extracted information to populate a visualization (e.g., a document tree) of the structure.

The extraction module 270 may also perform named entity linking (NEL) when extracting information from a document. In entity linking, words of interest (e.g., names of persons, locations, organizations, etc.) are mapped from text to corresponding entities in a target knowledge base. Words of interest are called named entities (NEs), and, here, the named entities may be any element, or part of an element. The target knowledge base for named linking may be based on the user of the DIE system 120, the type of document, or any other target knowledge base appropriate for the DIE system 120. As an example, a parent in a document may be "DAN'S BROWNIE HEAVEN, LTD.," a child may be "EMPLOYEES," and the grandchildren may be "CHRIS" and "DAN." In this example, the extraction module 270 may recognize that the parent element is an "organization," the child element is a "role," and the grandchildren elements are "persons." An extraction module 270 including NEL may provide additional context to the structure of a document.

Example Implementation

Figure 3:
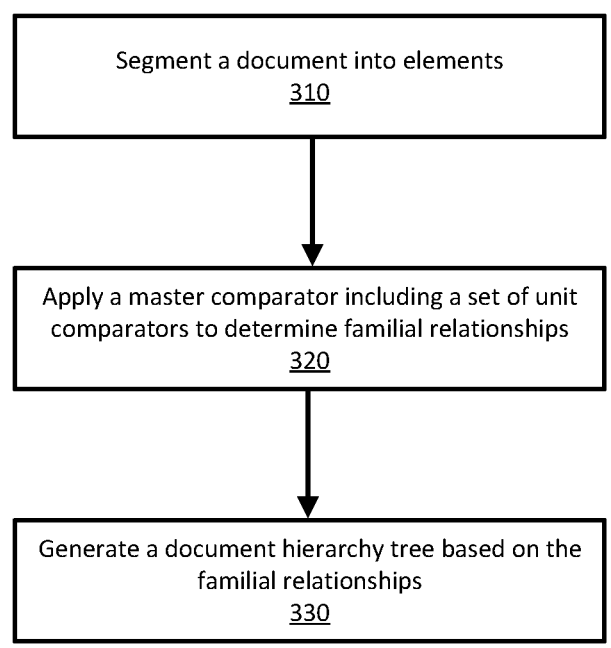
FIG. 3 illustrates a process flow for extracting information from a document using a document information extraction system, according to one example embodiment.

FIG. 3 illustrates a process flow for extracting information from a document using a document information extraction system, according to one example embodiment. The process flow may be implemented in an environment similar to the environment described in FIG. 1, but could be implemented in a different environment. The process includes several steps for extracting information from a document, but, in various other embodiments, the process could include additional or fewer steps. Further the steps may occur in any order and any of the steps may be repeated as necessary.

A client system (e.g., client system 110) is executing a DIE system (e.g., DIE system 120). The client system receives a document via a network (e.g., network 130). The client system inputs the document into the DIE system and the DIE system generates a document tree representing the structure of the document in response.

To generate the document tree, the DIE system employs a segmentation module (e.g., segmentation module 210) to segment the document into its constituent elements. Each of the elements has one or more location characteristics and/or one or more visual characteristics. The DIE system employs an adjacency module (e.g., adjacency module 220) to determine directional relationships between each of the elements. For example, the adjacency module may determine which elements are "to the left," "to the right," "above," or "below" other elements in the document. The DIE system may employ a clustering module (e.g., clustering module 230) to generate clusters. Clusters are groups of elements having similar characteristics.

The DIE system determines familial relationships between the elements in the document. To determine familial relationships, the DIE system applies 320 a master comparator (e.g., master comparator 240) to the elements in the document. The master comparator includes an ordered sequence of unit comparators (e.g., unit comparators 242A, 242B, 242C) with each unit comparator comparing a single characteristic (e.g., visual, location) between elements. The determined familial relationships represent the structure of the document inherent in the elements.

The DIE system employs a visualization module to generate 330 a document tree representing the structure based on the determined familial relationships. The document tree is a visual representation of the connectivity of familial relationships between the elements in the document.

Computer System

Figure 4:
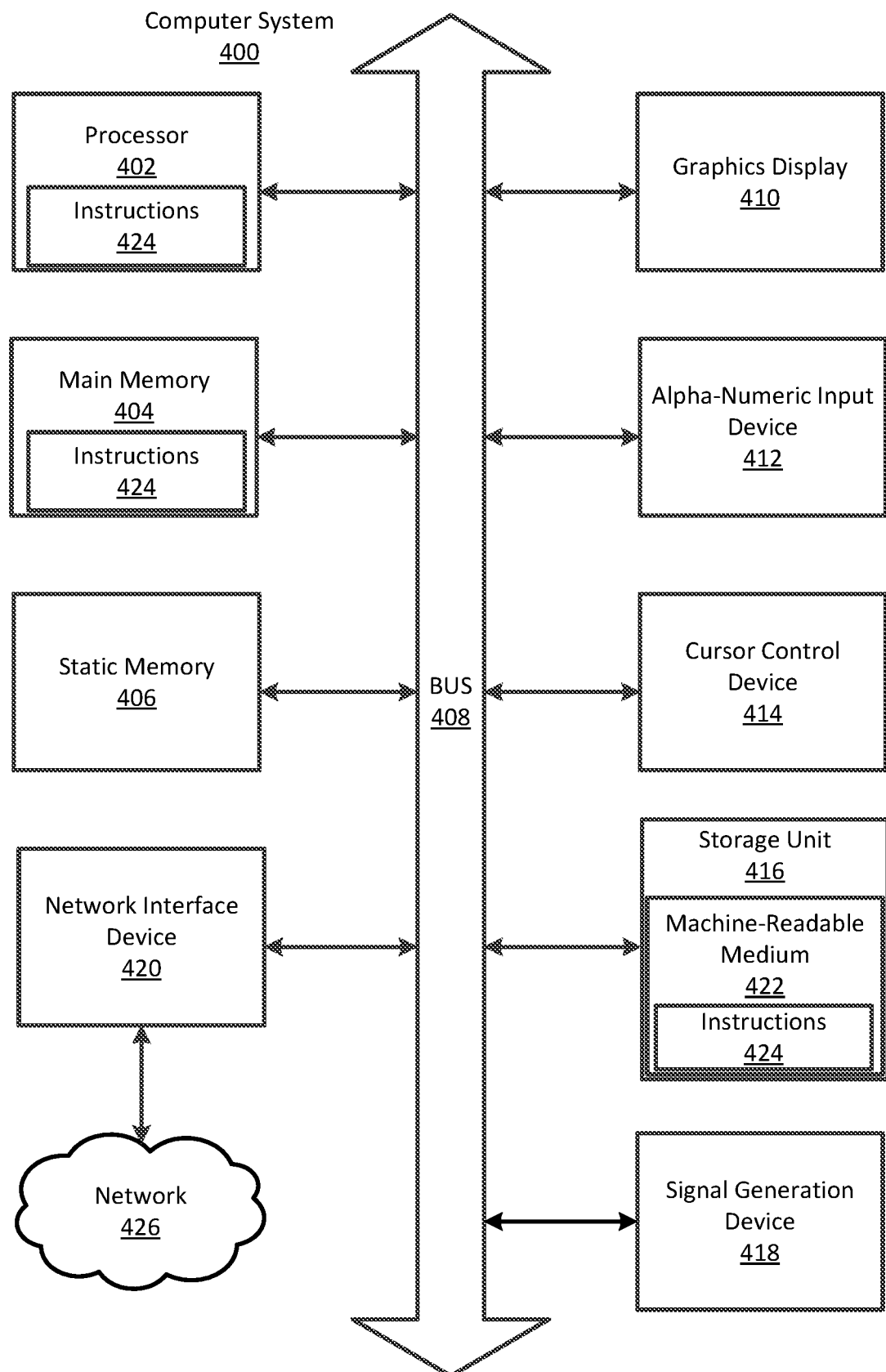
FIG. 4 illustrates a block diagram representing a computer system, according to one example embodiment.

FIG. 4 illustrates a block diagram representing a computer system, according to one example embodiment. Specifically, FIG. 4 shows a diagrammatic representation of DIE system 120 and client device 110 in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment (e.g., environment 100), or as a peer machine in a peer-to-peer (or distributed) system environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404, and the storage unit 416 communicate via a bus 408.

In addition, the computer system 400 can include a static memory 406, a graphics display 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. For example, the instructions 424 may include the functionalities of modules of the system 130 described in FIG. 1. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 (e.g., network 130) via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A computer-implemented method for determining a hierarchical structure of an electronic document, the method comprising:

segmenting the document into a plurality of elements that, in aggregate, include the hierarchical structure, and each element having one or more visual characteristics and one or more location characteristics;

applying a master comparator including a set of unit comparators to the segmented plurality of elements from the document to determine the hierarchical structure of the document, the master comparator determining the hierarchical structure by:

for each pair of elements in the document:

applying a unit comparator of the set of unit comparators to the pair of elements according to a predefined ordered sequence to generate an output digit, the unit comparator comparing a visual characteristic or a location characteristic of the pair of elements in the document to determine the output digit;

determining a familial relationship between the pair of elements indicated by the output digit;

responsive to the determined familial relationship for the pair of elements being a sibling relationship, applying a next unit comparator of the set of unit comparators to the pair of elements according to the predefined ordered sequence, the next unit comparator comparing a different visual characteristic or a different location characteristic of the pair of elements; and responsive to the determined familial relationship for the pair of elements being a parent relationship or an unrelated relationship, applying the master comparator to a next pair of elements in the document;

wherein the determined familial relationships between each pair of elements of the plurality of elements identify the hierarchical structure of the document; and generating, for display on a client device, a visualization of a document hierarchy tree representing the hierarchical structure of the document, the visualization illustrating the determined familial relationships between each pair of elements of the plurality of elements in the document.

2. The method of claim 1, further comprising:

for each element, determining a plurality of directional relationships for the element, the directional relationship defining an adjacency type between the element and any adjacent element in the document, and wherein the master comparator compares pairs of elements based on the directional relationships.

3. The method of claim 2, wherein the familial relationships are further based on the directional relationships between elements.

4. The method of claim 1, wherein each unit comparator in the set of set of unit comparators compares a different visual characteristic.

5. The method of claim 1, wherein each unit comparator of the set of unit comparators compares a different location characteristic.

6. The method of claim 1, wherein determining the hierarchal structure further comprises:
   determining a formatting structure for the plurality of elements in the document, and
   wherein hierarchical structure is based on the formatting structure.

7. The method of claim 1, wherein determining the hierarchal structure further comprises:
   determining an indexing structure for the plurality of elements in the document, and
   wherein hierarchical structure is based on the indexing structure.

8. The method of claim 1, wherein the hierarchical structure of the document comprises a plurality of familial relationships, and the plurality of familial relationships comprises a plurality of parent relationships, a plurality of child relationships, and a plurality of sibling relationships.

9. The method of claim 8, wherein:
   the document includes a first element and a second element,
   a parent relationship between the first element and the second element defines the first element having a higher-level hierarchy in the hierarchical structure of the document than the second element,
   a child relationship between the first element and the second element defines the first element having a lower-level hierarchy in the hierarchical structure of the document than the second element, and
   a sibling relationship between the first element and the second element defines the first element and the second element having a same-level hierarchy in the hierarchical structure of the document.

10. The method of claim 1, further comprising:
    validating the familial relationships between the plurality of elements by applying the master comparator to pairs of elements having a grandparent and a grandchild relationship in the hierarchical structure of the document.

11. The method of claim 1, further comprising:
    receiving, from a remote client system, a request to generate the visualization; and
    transmitting the visualization to the remote client system.

12. The method of claim 11, wherein the request includes a configuration request comprising the predefined sequence of the set of unit comparators of the master comparator.

13. The method of claim 1, wherein applying the set of unit comparators to each pair of elements in the document comprises sequentially comparing individual visual characteristics or location characteristics for each pair of elements.

14. The method of claim 1, wherein each unit comparator in the ordered set of unit comparators compares only one visual characteristic for each pair of elements in the electronic document.

15. The method of claim 1, wherein each unit comparator in the ordered set of unit comparators compares only one location characteristic for each pair of elements in the electronic document.

16. The method of claim 1, wherein applying the set of unit comparators in the ordered sequences comprises applying less than all of the unit comparators in the set.

17. The method of claim 1, wherein the predefined ordered sequence is defined by a system administrator.

18. A non-transitory computer readable storage medium including computer instructions for determining a hierarchical structure of an electronic document, the computer instructions, when executed by a processor, causing the processor to:
    segment the document into a plurality of elements that, in aggregate, include the hierarchical structure, and each element having one or more visual characteristics and one or more location characteristics;
    apply a master comparator including a set of unit comparators to the segmented plurality of elements from the document to determine the hierarchical structure of the document, the master comparator determining the hierarchical structure by:
    for each pair of elements in the document:
       applying a unit comparator of the set of unit comparators to the pair of elements according to a predefined ordered sequence to generate an output digit, the unit comparator comparing visual characteristics or location characteristics of the pair of elements in the document to determine the output digit;
       determining a familial relationship indicated by the output digit;
       responsive to the output digit indicating a sibling relationship between the pair of elements, applying a next unit comparator of the set of unit comparators to pair of element according to the redefined ordered sequence:
       responsive to the output digit indicating a parent or unrelated relationship between the pair of elements, applying the master comparator to a next pair of elements in the document;
    wherein the determined familial relationships between each pair of elements of the plurality of elements identify the hierarchical structure of the document; and
    generate, for display on a client device, a visualization of a document hierarchy tree representing the hierarchical structure of the document, the visualization illustrating the determined familial relationships between each pair of elements of the plurality of elements in the document.

19. The non-transitory computer readable storage medium of claim 18, wherein the computer instructions, when executed by the processor, further cause the processor to:
    for each element, determine a plurality of directional relationships for the element, the directional relationship defining an adjacency type between the element and any adjacent element in the document, and
    wherein the master comparator compares pairs of elements based on the directional relationships.

20. The non-transitory computer readable storage medium of claim 19, wherein the familial relationships are further based on the directional relationships between elements.

21. The non-transitory computer readable storage medium of claim 18, wherein each unit comparator in the set of set of unit comparators compares a different visual characteristic.

22. The non-transitory computer readable storage medium of claim 18, wherein each unit comparator of the set of unit comparators compares a different location characteristic.

23. The non-transitory computer readable storage medium of claim 18, wherein the hierarchical structure of the document comprises a plurality of familial relationships, and the plurality of familial relationships comprises a plurality of parent relationships, a plurality of child relationships, and a plurality of sibling relationships.

24. The non-transitory computer readable storage medium of claim 18, wherein:
- the document includes a first element and a second element,
- a parent relationship between the first element and the second element defines the first element having a higher-level hierarchy in the hierarchical structure of the document than the second element,
- a child relationship between the first element and the second element defines a the first element segment having a lower-level hierarchy in the hierarchical structure of the document than the second element, and
- a sibling relationship between the first element and the second element defines the first element and the second element having a same-level hierarchy in the hierarchical structure of the document.

25. The non-transitory computer readable storage medium of claim 18, wherein the predefined ordered sequence is defined by a system administrator.

26. A system for determining a hierarchical structure of an electronic document, the system comprising:
- a computer processor for executing computer program instructions; and
- a non-transitory computer-readable medium storing computer program instructions executable by the computer processor to perform operations comprising:
  - segmenting the document into a plurality of elements that, in aggregate, include the hierarchical structure, and each element having one or more visual characteristics and one or more location characteristics;
  - applying a master comparator including a set of unit comparators to the segmented plurality of elements from the document to determine the hierarchical structure of the document, the master comparator determining the hierarchical structure by:
    - for each pair of elements in document:
      - applying a unit comparator of the set of unit comparators to the pair of elements according to a predefined ordered sequence to generate an output digit, the unit comparator comparing a visual characteristic or a location characteristic of the pair of elements in the document to determine the output digit;
      - determining a familial relationship between the pair of elements indicated by the output digit;
      - responsive to the determined familial relationship for the pair of elements being a sibling relationship, applying a next unit comparator of the set of unit comparators to the pair of elements according to the predefined ordered sequence, the next unit comparator comparing a different visual characteristic or a different location characteristic of the pair of elements; and
      - responsive to the determined familial relationship for the pair of elements being a parent relationship or an unrelated relationship, applying the master comparator to a next pair of elements in the document;
  - wherein the determined familial relationships between each pair of elements of the plurality of elements identify the hierarchical structure of the document; and
  - generating a document hierarchy tree representing the hierarchical structure of the document, the document hierarchy tree a visualization of the familial relationships between the plurality of elements.

27. The system of claim 26, wherein the predefined ordered sequence is defined by a system administrator.

* * * * *

UNITED STATES PATENT AND TRADEMARK OFFICE
CERTIFICATE OF CORRECTION

PATENT NO. : 11,657,101 B2  
APPLICATION NO. : 16/740754  
DATED : May 23, 2023  
INVENTOR(S) : Walia et al.

Page 1 of 1

It is certified that error appears in the above-identified patent and that said Letters Patent is hereby corrected as shown below:

In the Claims

In Column 14, in Claim 4, Line 66, delete "set of set of" and insert -- set of --, therefor.

In Column 16, in Claim 18, Line 27, delete "to pair of element" and insert -- to the pair of elements --, therefor.

In Column 16, in Claim 18, Line 28, delete "redefined ordered sequence:" and insert -- predefined ordered sequence; --, therefor.

In Column 16, in Claim 21, Lines 56-57, delete "set of set of" and insert -- set of --, therefor.

In Column 17, in Claim 24, Line 10, delete "a the first" and insert -- the first --, therefor.

In Column 18, in Claim 26, Line 1, delete "in document:" and insert -- in the document: --, therefor.

Signed and Sealed this  
Twenty-ninth Day of August, 2023

Katherine Kelly Vidal  
*Director of the United States Patent and Trademark Office*